(12) United States Patent
Patel et al.

(10) Patent No.: US 7,697,535 B2
(45) Date of Patent: Apr. 13, 2010

(54) ERROR RESILIENT PROTOCOL DATA UNIT BOUNDARY DETECTION

(76) Inventors: Bhaskar Patel, 61 Via Sonrisa, San Clemente, CA (US) 92673; Arumugam Govindswamy, 22 Ohio, Irvine, CA (US) 92606

( * ) Notice: Subject to any disclaimer, the term of this patent is extended or adjusted under 35 U.S.C. 154(b) by 77 days.

(21) Appl. No.: 12/218,167

(22) Filed: Jul. 11, 2008

(65) Prior Publication Data
US 2009/0016351 A1    Jan. 15, 2009

Related U.S. Application Data

(60) Provisional application No. 60/958,978, filed on Jul. 11, 2007.

(51) Int. Cl.
*H04L 12/28* (2006.01)
(52) U.S. Cl. .................. 370/392; 370/252; 370/338
(58) Field of Classification Search .................. None
See application file for complete search history.

(56) References Cited

U.S. PATENT DOCUMENTS

| 7,492,789 B2* | 2/2009 | Shvodian ............... 370/469 |
| 7,567,528 B2* | 7/2009 | Naghian et al. ......... 370/328 |

* cited by examiner

*Primary Examiner*—Duc C Ho
(74) *Attorney, Agent, or Firm*—Lerner, David, Littenberg, Krumholz & Mentlik, LLP

(57) ABSTRACT

The present invention provides systems and methods for boundary detection of protocol data units in a communication system. A protocol entity such as a header check sequence (HCS) validation circuit is used to compute header check sequences of protocol data units in a packet burst. If a given HCS is valid, then the payload of the respective protocol data unit may be used. However, if the given HCS is invalid, then a parallel sliding window is used to compute other possible HCSs to identify a protocol data unit boundary. Once the boundary is located, then the payload may be used. Even if a protocol data unit is invalid or a header is not found, other protocol data units in a packet burst may be used in accordance with aspects of the invention. Such operation reduces the number of retransmissions required due to invalid HCSs.

22 Claims, 17 Drawing Sheets

| Table Location | Content | Table Location | Content | Table Location | Content | Table Location | Content |
|---|---|---|---|---|---|---|---|
| 0 | 0 | 64 | 199 | 128 | 137 | 192 | 78 |
| 1 | 7 | 65 | 192 | 129 | 142 | 193 | 73 |
| 2 | 14 | 66 | 201 | 130 | 135 | 194 | 64 |
| 3 | 9 | 67 | 206 | 131 | 128 | 195 | 71 |
| 4 | 28 | 68 | 219 | 132 | 149 | 196 | 82 |
| 5 | 27 | 69 | 220 | 133 | 146 | 197 | 85 |
| 6 | 18 | 70 | 213 | 134 | 155 | 198 | 92 |
| 7 | 21 | 71 | 210 | 135 | 156 | 199 | 91 |
| 8 | 56 | 72 | 255 | 136 | 177 | 200 | 118 |
| 9 | 63 | 73 | 248 | 137 | 182 | 201 | 113 |
| 10 | 54 | 74 | 241 | 138 | 191 | 202 | 120 |
| 11 | 49 | 75 | 246 | 139 | 184 | 203 | 127 |
| 12 | 36 | 76 | 227 | 140 | 173 | 204 | 106 |
| 13 | 35 | 77 | 228 | 141 | 170 | 205 | 109 |
| 14 | 42 | 78 | 237 | 142 | 163 | 206 | 100 |
| 15 | 45 | 79 | 234 | 143 | 164 | 207 | 99 |
| 16 | 112 | 80 | 183 | 144 | 249 | 208 | 62 |
| 17 | 119 | 81 | 176 | 145 | 254 | 209 | 57 |
| 18 | 126 | 82 | 185 | 146 | 247 | 210 | 48 |
| 19 | 121 | 83 | 190 | 147 | 240 | 211 | 55 |
| 20 | 108 | 84 | 171 | 148 | 229 | 212 | 34 |
| 21 | 107 | 85 | 172 | 149 | 226 | 213 | 37 |
| 22 | 98 | 86 | 165 | 150 | 235 | 214 | 44 |
| 23 | 101 | 87 | 162 | 151 | 236 | 215 | 43 |
| 24 | 72 | 88 | 143 | 152 | 193 | 216 | 6 |
| 25 | 79 | 89 | 136 | 153 | 198 | 217 | 1 |
| 26 | 70 | 90 | 129 | 154 | 207 | 218 | 8 |
| 27 | 65 | 91 | 134 | 155 | 200 | 219 | 15 |
| 28 | 84 | 92 | 147 | 156 | 221 | 220 | 26 |
| 29 | 83 | 93 | 148 | 157 | 218 | 221 | 29 |
| 30 | 90 | 94 | 157 | 158 | 211 | 222 | 20 |
| 31 | 93 | 95 | 154 | 159 | 212 | 223 | 19 |
| 32 | 224 | 96 | 39 | 160 | 105 | 224 | 174 |
| 33 | 231 | 97 | 32 | 161 | 110 | 225 | 169 |
| 34 | 238 | 98 | 41 | 162 | 103 | 226 | 160 |
| 35 | 233 | 99 | 46 | 163 | 96 | 227 | 167 |
| 36 | 252 | 100 | 59 | 164 | 117 | 228 | 178 |
| 37 | 251 | 101 | 60 | 165 | 114 | 229 | 181 |
| 38 | 242 | 102 | 53 | 166 | 123 | 230 | 188 |
| 39 | 245 | 103 | 50 | 167 | 124 | 231 | 187 |
| 40 | 216 | 104 | 31 | 168 | 81 | 232 | 150 |
| 41 | 223 | 105 | 24 | 169 | 86 | 233 | 145 |
| 42 | 214 | 106 | 17 | 170 | 95 | 234 | 152 |
| 43 | 209 | 107 | 22 | 171 | 88 | 235 | 159 |
| 44 | 196 | 108 | 3 | 172 | 77 | 236 | 138 |
| 45 | 195 | 109 | 4 | 173 | 74 | 237 | 141 |
| 46 | 202 | 110 | 13 | 174 | 67 | 238 | 132 |
| 47 | 205 | 111 | 10 | 175 | 68 | 239 | 131 |
| 48 | 144 | 112 | 87 | 176 | 25 | 240 | 222 |
| 49 | 151 | 113 | 80 | 177 | 30 | 241 | 217 |
| 50 | 158 | 114 | 89 | 178 | 23 | 242 | 208 |
| 51 | 153 | 115 | 94 | 179 | 16 | 243 | 215 |
| 52 | 140 | 116 | 75 | 180 | 5 | 244 | 194 |
| 53 | 139 | 117 | 76 | 181 | 2 | 245 | 197 |
| 54 | 130 | 118 | 69 | 182 | 11 | 246 | 204 |
| 55 | 133 | 119 | 66 | 183 | 12 | 247 | 203 |
| 56 | 168 | 120 | 111 | 184 | 33 | 248 | 230 |
| 57 | 175 | 121 | 104 | 185 | 38 | 249 | 225 |
| 58 | 166 | 122 | 97 | 186 | 47 | 250 | 232 |
| 59 | 161 | 123 | 102 | 187 | 40 | 251 | 239 |
| 60 | 180 | 124 | 115 | 188 | 61 | 252 | 250 |
| 61 | 179 | 125 | 116 | 189 | 58 | 253 | 253 |
| 62 | 186 | 126 | 125 | 190 | 51 | 254 | 244 |
| 63 | 189 | 127 | 122 | 191 | 52 | 255 | 243 |

ERROR RESILIENT PROTOCOL DATA UNIT BOUNDARY DETECTION

CROSS-REFERENCE TO RELATED APPLICATION

This application claims the benefit of the filing date of U.S. Provisional Patent Application No. 60/958,978 filed Jul. 11, 2007, and entitled "Error Resilient Protocol Data Unit Boundary Detection," the entire disclosure of which is hereby expressly incorporated by reference herein.

FIELD OF THE INVENTION

The present invention relates generally to digital communication systems and, more particularly, to digital communication systems that employs packet data transmission.

BACKGROUND OF THE INVENTION

The Open Systems Interconnection ("OSI") Basic Reference Model is a layered, abstract description for communication systems and computer networks as shown in FIG. 1. Many communication systems are normally designed according to the OSI layered model. A layer is a collection of related functions that provides services to the layer above it and receives services from the layer below it. In a layered model of a communication system, there are different processing entities in each layer at both ends of a communication system.

A processing entity in each layer at one end of a communication system normally communicates with a processing entity at the same layer at the other end of the communication system. The processing entities at the same hierarchical layer at any two ends of a communication system, referred as peers, is illustrated in FIG. 1. For example the Physical layer at one end of the communication system is peer to the Physical layer at the other end of the communication system as illustrated in FIG. 1.

There may be different communication protocols defined for each layer. The peers at each layer communicate with each other using these protocols. Also each peer entity normally communicates with the processing entities in the layer above it and the layer below it. The unit of data exchanged at a given layer is referred as a Protocol Data Unit ("PDU"). The names of the PDUs at different layers may be different in different communication systems. For example, a PDU at Network layer is referred as an N-PDU and a PDU at Transport later is referred as a T-PDU.

A protocol entity in one layer may often format the PDUs received from its adjacent layers into a structure that is more suitable for further processing in its own layer. A typical PDU may have two kinds of information, namely control information and user data. Often, user data is also referred to as payload data.

The control information contains necessary details that describe the rest of the PDU. For example, the control information may include source and destination addresses, error detection codes such as Cyclic Redundancy Check ("CRC"), length of the PDU, sequencing information, etc. The control information is generally located at the beginning of a PDU. There may also be some control information such as CRC, message authentication codes, etc. located at the end of a PDU. The control information that is located at the beginning of a PDU is often referred as "Header." The control information that is located at the end of the PDU is often referred as "Trailer."

Normally the control information and the payload data are collectively called as a PDU for a particular layer. Some PDUs may contain both a Header and a Trailer for control information while some PDUs may contain only a Header for control information. The presence of a Trailer may be negotiated by two peer protocol entities or may be indicated by the PDU Header. The generic structure of a PDU with Header, Trailer and the payload data is illustrated in FIG. 2. Normally the control information added to the payload data by one protocol layer is treated as payload data by a protocol layer below it, as illustrated in FIG. 3.

Often the formatting of data by a protocol entity includes fragmentation, reassembly, and concatenation operations as shown in FIG. 4. These types of operations are required for variety of reasons including the maximum PDU size limitation of some networks, different payload data being multiplexed over a physical communication medium, different preferred PDU sizes for different applications, etc. For example, real-time applications such as Voice over Internet Protocol ("VoIP") may prefer smaller PDU sizes whereas non real-time applications such as file transfer may prefer larger PDU sizes. Furthermore, the physical layer protocol entity which communicates over the physical medium may use the PDU sizes that are optimal for communication over the particular physical medium of the communication system. For example if the communication medium is wireless, normally the PDU sizes may be small.

The concatenation operation at the transmitter groups a number of PDUs in a single unit of data for further processing. This single unit of data that includes one or more PDUs is referred herein as a "burst" as shown in FIG. 5. Note that some PDUs in a burst may have both a Header and a Trailer while others may have only the Header depending on the actual protocol being used by peer entities and different types of payload data. At the receiver, the corresponding peer protocol entities accept a burst of data that contains one or more PDUs, checks the control information in the PDU Header and unpacks the individual PDUs from the received burst.

Often there are errors introduced along the communication path as the data travels from one end to the other end. Some of these errors may be corrected by error correcting codes that may be typically used by the Physical layer entity of the communication system. However, the error correcting codes used at the Physical layer entity may not be able to detect and/or correct some of the errors. The protocol entities above the Physical layer entity may need to detect errors that are not corrected by the Physical layer entity. A commonly used technique for detecting uncorrected errors is the CRC. Often a CRC is included along with other control information in a PDU. The corresponding peer entity at the receiver checks this control information in the PDU and determines whether the PDU is error free and then takes appropriate action.

Since the PDU Header contains critical control information that describes the rest of the PDU, it is important to ensure the correctness of the PDU Header. For this purpose, some communication systems compute and insert a separate CRC specifically for the PDU Header and append it as part of the PDU Header as shown in FIG. 6. The CRC for the PDU Header is referred to herein as a Header Check Sequence ("HCS"). Often the length of the PDU Header for protocols at some layers is fixed and it may be known a priori. Normally, the receiver of the communication system uses the HCS that is included in the PDU Header to determine its correctness. If the HCS computed by the receiver matches with the received HCS, then the PDU Header may be considered valid otherwise it may be considered invalid. If the PDU Header is valid, the rest of the PDU may be processed further based on the control information in the PDU Header.

It is to be noted that a PDU may have a separate CRC for the PDU Header and a separate CRC for the actual payload data. The CRC for the PDU Header, i.e., the HCS, only checks the validity of the PDU Header. The CRC for the validity of the payload data in the PDU may be checked separately once the length of the PDU is determined from the PDU Header. The presence of the CRC for the payload data may be negotiated between protocol entities or may be indicated in the PDU Header.

In many scenarios the length of the PDU varies and therefore the length information is generally included in the PDU Header. If the receiver determines that the PDU Header is invalid based on the HCS for a given PDU, the length information in the PDU Header is not usable. Therefore, the receiver may not able to determine the length of the PDU.

When multiple PDUs are concatenated in a single burst as shown in FIG. 5, it is necessary to know the length of each PDU in the burst at the receiver to unpack the individual PDUs in the case where the PDUs are of variable length. Normally, the length of the burst is known to the protocol entity that is processing the burst at the receiver. It is known a priori that the burst starts with a Header of the first PDU in the burst.

The receiver checks the validity of the first PDU Header by verifying its HCS. If the first PDU Header is valid, the receiver can use the length information from the first PDU Header to determine the length of the first PDU and thus determines the beginning of the second PDU in that received burst. Next, the receiver checks the validity of the Header of the second PDU using its HCS. If the second PDU Header is valid, the receiver uses the length field from the second PDU Header to determine the length of the second PDU and thus determines the beginning of the next PDU in that received burst. This continues until all of the PDUs in the received burst are unpacked, as shown in FIG. 7, where the arrows indicate that the process continues to the next PDU after the current PDU is validated, such as by analyzing its HCS.

If the protocol entity at the receiver determines that the. Header of a PDU is invalid, then the length information in the PDU Header is not usable to determine the length of that PDU. If the length of a current PDU is not known, it may not be possible to determine the end of the current PDU. Thus, it may not be possible to determine the beginning of the next PDU that may be present in the received burst of data as shown in FIG. 8. Therefore, the rest of the PDU boundaries in the received burst of data may not be detected by the protocol entity at the receiver.

In this scenario, regardless of the validity of the rest of the PDUs in the received burst of data, the receiver may discard the current and the rest of the PDUs in the received burst of data being processed. This leads to significant loss of data that may have been received successfully at the receiver. This in turn may require some unnecessary retransmissions from upper layer entities which may lead to reduced throughput and waste of bandwidth which is a precious resource in a communication system. In some real-time applications, for example VoIP, the retransmissions may not be useful due to latency issues. This leads to loss of data which may in turn degrade the quality of service.

SUMMARY OF THE INVENTION

In accordance with an embodiment of the present invention, a method of processing received data in a communication system is provided. The method comprises receiving a burst of data with a protocol entity of a receiver, the burst of data including a plurality of protocol data units, each protocol data unit having a header and a payload, the header including a header check sequence therein; analyzing the burst of data to determine whether the header check sequence of a given protocol data unit in the burst of data is valid; if the header check sequence of the given protocol data unit in the burst of data is valid, then: performing header format validation on the given protocol data unit; and analyzing the burst of data to determine whether the header check sequence of a next protocol data unit in the burst of data is valid; if the header check sequence of the given protocol data unit in the burst of data is invalid, then: advancing a parallel sliding window by a number of bytes that is equal to a first integral multiple of K that is equal to or greater than N and computing a subsequent header check sequence, wherein N bytes is the length of the header of the given protocol data unit; and if the subsequent header check sequence is valid, then performing the header format validation on the given protocol data unit; wherein the payload of a valid protocol data unit is output for subsequent processing by the receiver.

In one alternative, upon performing header format validation, the method further comprises extracting a length field from the header of the given protocol data unit; computing a starting point of the next protocol data unit header; and providing the starting point to the protocol entity for further processing of the received burst of data. In this case, after the starting point of the next protocol data unit header is computed, the method may further determine if the end of the burst has been reached, and if the end of the burst has not been reached, then analyze the burst of data to determine whether the header check sequence of a next protocol data unit in the burst of data is valid.

In another alternative, if the subsequent header check sequence is invalid, then the method further comprises advancing the parallel sliding window by K bytes. In one example, K has a value of 1. In this case, the method may further comprise issuing a header check sequence validity indicator on a per-byte basis. Optionally, a first input of the parallel sliding window may be applied to a generator polynomial table and a second input of the parallel sliding window may be exclusive-ORed with an output of the generator polynomial. In this case, the generator polynomial table may be stored in memory of the receiver. Alternatively, the generator polynomial table may be computed on an as-needed basis.

In a further alternative, when a given protocol data unit boundary is known, only data corresponding to the header of a specific protocol data unit associated with the given boundary is processed by the parallel sliding window.

In yet another alternative, if the header check sequence of the given protocol data unit is invalid and if the payload of the given protocol data unit includes an error detection parameter therein, then the method further comprises outputting the payload of the given protocol data unit for subsequent processing by the receiver if a computed error detection parameter matches with the included error detection parameter.

In accordance with another embodiment of the present invention, a recording medium is recorded with a computer program for execution by a processor to process received data in a communication system. The process comprises receiving a burst of data with a protocol entity of a receiver, the burst of data including a plurality of protocol data units, each protocol data unit having a header and a payload, the header including a header check sequence therein; analyzing the burst of data to determine whether the header check sequence of a given protocol data unit in the burst of data is valid; if the header check sequence of the given protocol data unit in the burst of data is valid, then: performing header format validation on the given protocol data unit; and analyzing the burst of data to determine whether the header check sequence of a next protocol data unit in the burst of data is valid; if the header check sequence of the given protocol data unit in the burst of data is invalid, then: advancing a parallel sliding window by a number of bytes that is equal to a first integral multiple of K that is equal to or greater than N and computing a subsequent header check sequence, wherein N bytes is the length of the header of the given protocol data unit; and if the subsequent header check sequence is valid, then performing the header format validation on the given protocol data unit; wherein the payload of a valid protocol data unit is output for subsequent processing by the receiver.

In a further embodiment of the present invention, a communication device for use on a communication network is provided. The communication device comprises a baseband subsystem and a receiver subsystem. The baseband subsystem includes a processor for managing operations of the communication device. The receiver subsystem is operatively connected to the baseband subsystem. The receiver subsystem includes a protocol entity operable to receive a burst of data from a transmitter on the communication network, the burst of data including a plurality of protocol data units, each protocol data unit having a header and a payload, the header including a header check sequence therein. The processor is operable to manage the protocol entity analyzing the burst of data to determine whether the header check sequence of a given protocol data unit in the burst of data is valid. If the header check sequence of the given protocol data unit in the burst of data is valid, then: the protocol entity performs header format validation on the given protocol data unit; and analyzes the burst of data to determine whether the header check sequence of a next protocol data unit in the burst of data is valid. If the header check sequence of the given protocol data unit in the burst of data is invalid, then: the protocol entity advances a parallel sliding window by a number of bytes that is equal to a first integral multiple of K that is equal to or greater than N and computing a subsequent header check sequence, wherein N bytes is the length of the header of the given protocol data unit. If the subsequent header check sequence is valid, then the protocol entity performs the header format validation on the given protocol data unit.

In an alternative, upon performing header format validation, the protocol entity further extracts a length field from the header of the given protocol data unit and computes a staring point of the next protocol data unit header. In this case, after the starting point of the next protocol data unit header is computed, the protocol entity optionally determines if the end of the burst has been reached. If the end of the burst has not been reached, then the protocol entity may analyze the burst of data to determine whether the header check sequence of a next protocol data unit in the burst of data is valid.

In another alternative, if the subsequent header check sequence is invalid, then the protocol entity advances the parallel sliding window by K bytes. Here, a first input of the parallel sliding window may be applied to a generator polynomial table and a second input of the parallel sliding window may be exclusive-ORed with an output of the generator polynomial. In one example, the generator polynomial table is stored in memory of the communication device. In another example, the generator polynomial table is computed on an as-needed basis by the processor.

In a further alternative, the communication network is a wireless communication network, the communication device is a wireless communication device and the receiver subsystem further comprises at least one receive chain operable to receive signals from at least one channel of the wireless communication network. In one example, the communication device is a mobile station. In another example, the device is a base station of the wireless communication network.

BRIEF DESCRIPTION OF THE DRAWINGS

FIG. 14 presents an exemplary generator polynomial table for use with aspects of the present invention.

DETAILED DESCRIPTION

Figure 1:
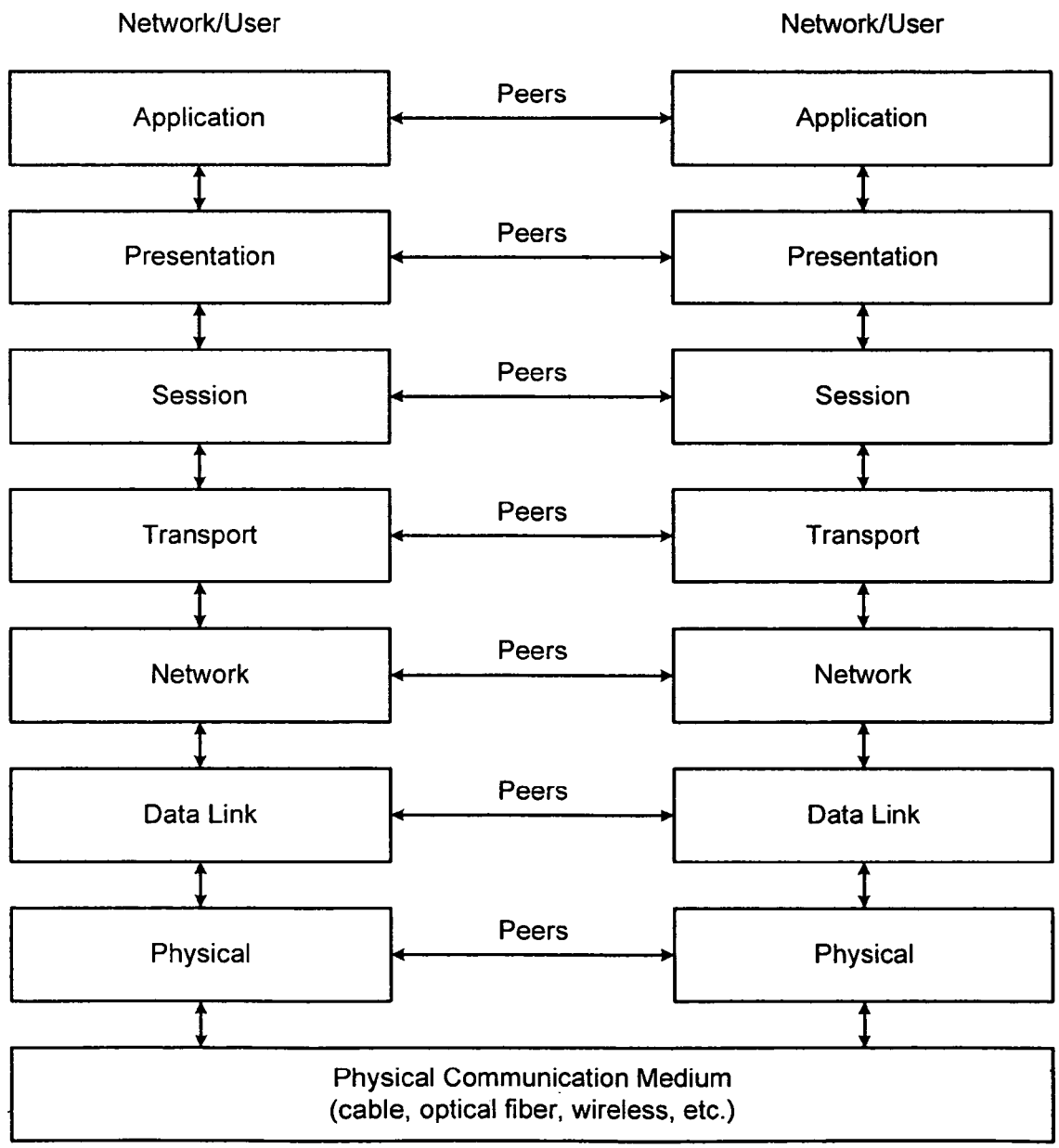
FIG. 1 illustrates an Open System Interconnect Layered Reference model for communication systems.
Figure 2:
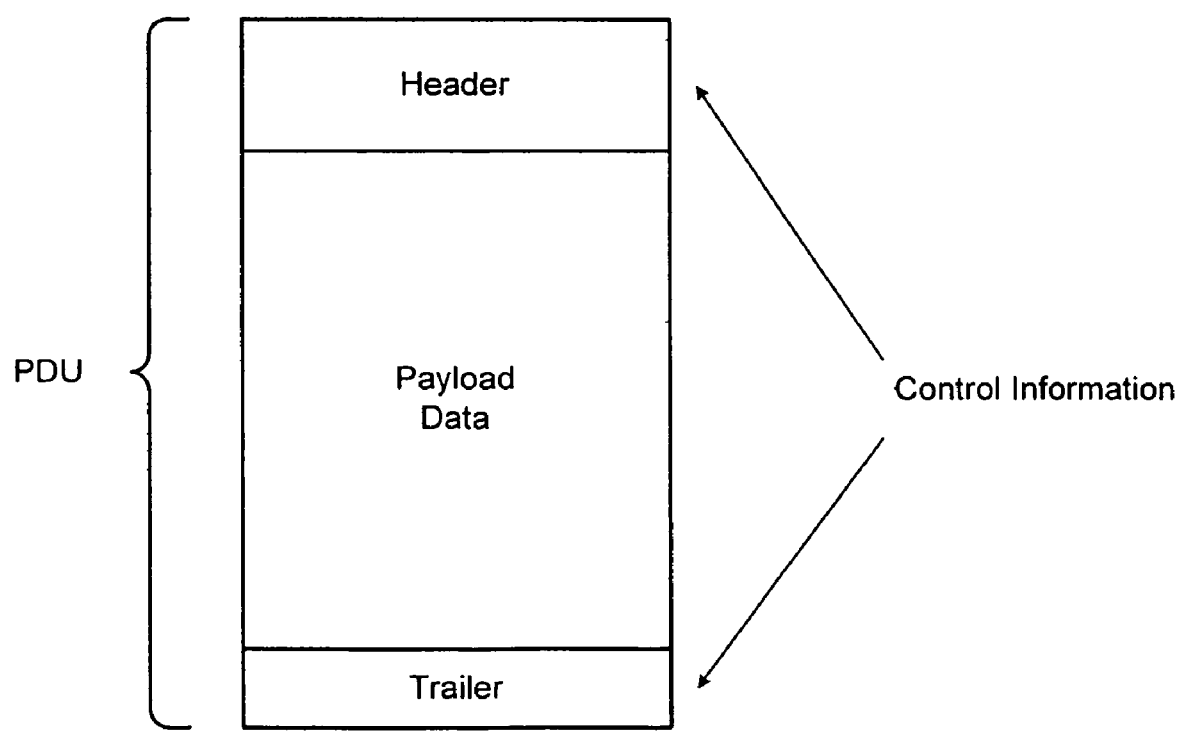
FIG. 2 illustrates a structure of a Protocol Data Unit.
Figure 3:
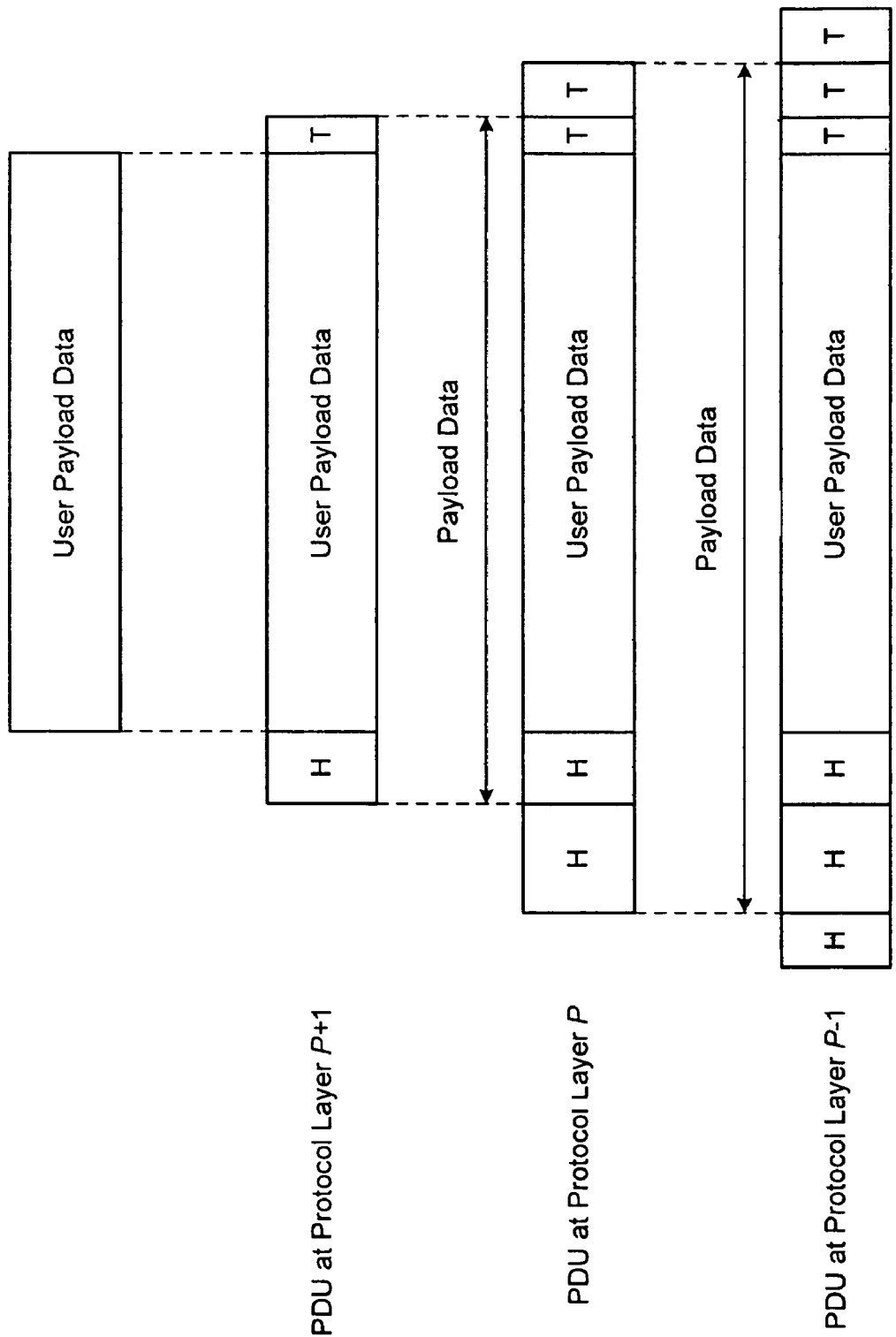
FIG. 3 illustrates a process of inserting Headers and Trailers by protocol entities at different layers.
Figure 4:
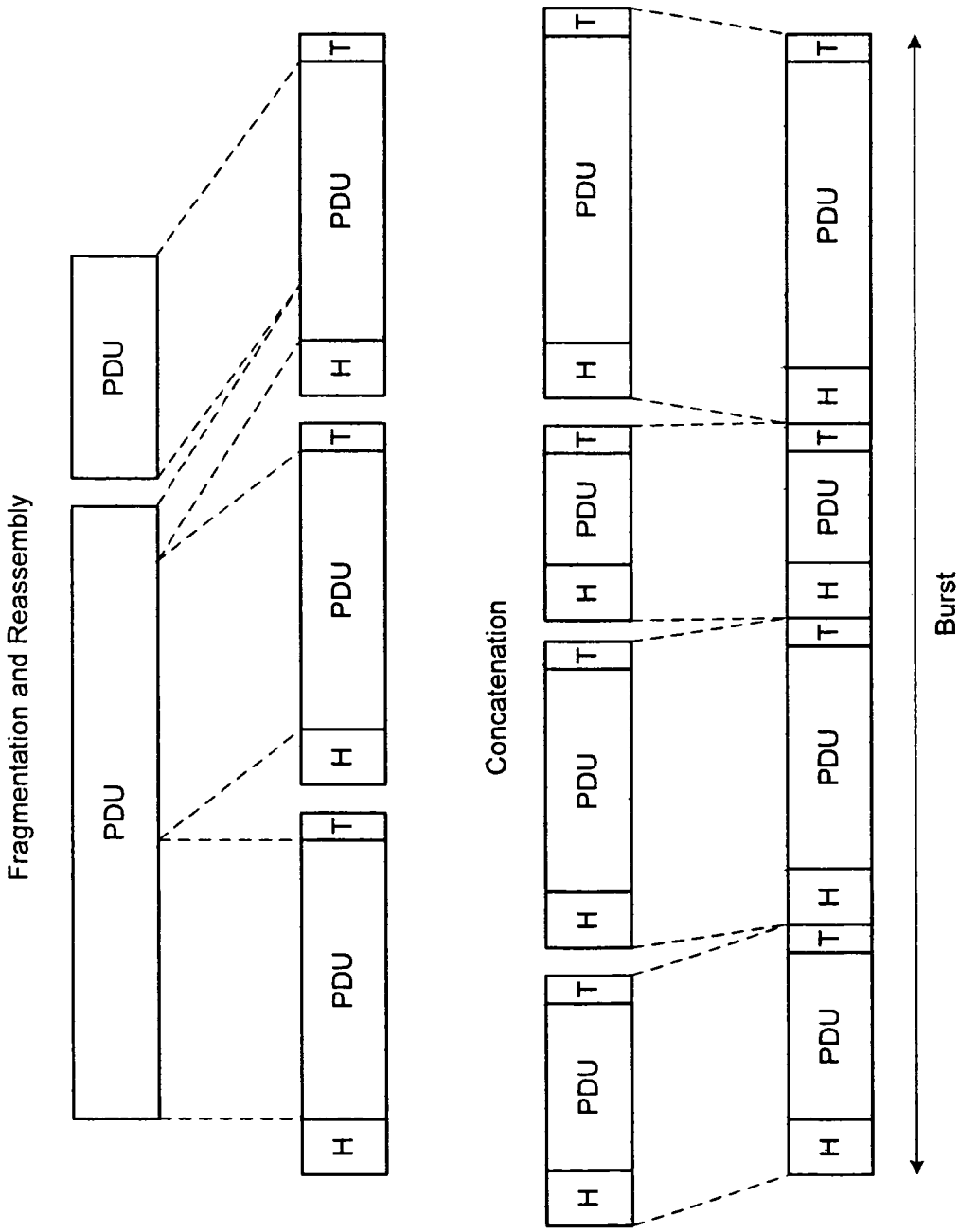
FIG. 4 illustrates segmentation, reassembly, and concatenation of Protocol Data Units.

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

In accordance with aspects of the present invention, a method and apparatus enable a protocol entity in a device such as a receiver to determine the PDU boundaries even when a PDU Header is detected as invalid for one or more of the PDUs that are grouped together in a received burst of data. The error resilient PDU boundary detection method described herein may in turn enable a protocol entity in a receiver to unpack and use some or all of the PDUs in the current received burst of data that otherwise may have been discarded. This improves the throughput for the receiver and for the overall communication network. The method described herein reduces some unnecessary retransmissions, which may lead to improved throughput and efficient use of the channel bandwidth of the communication system. For real-time applications, aspects of the invention described herein may reduce the loss of data which may in turn improve the quality of service.

Figure 5:
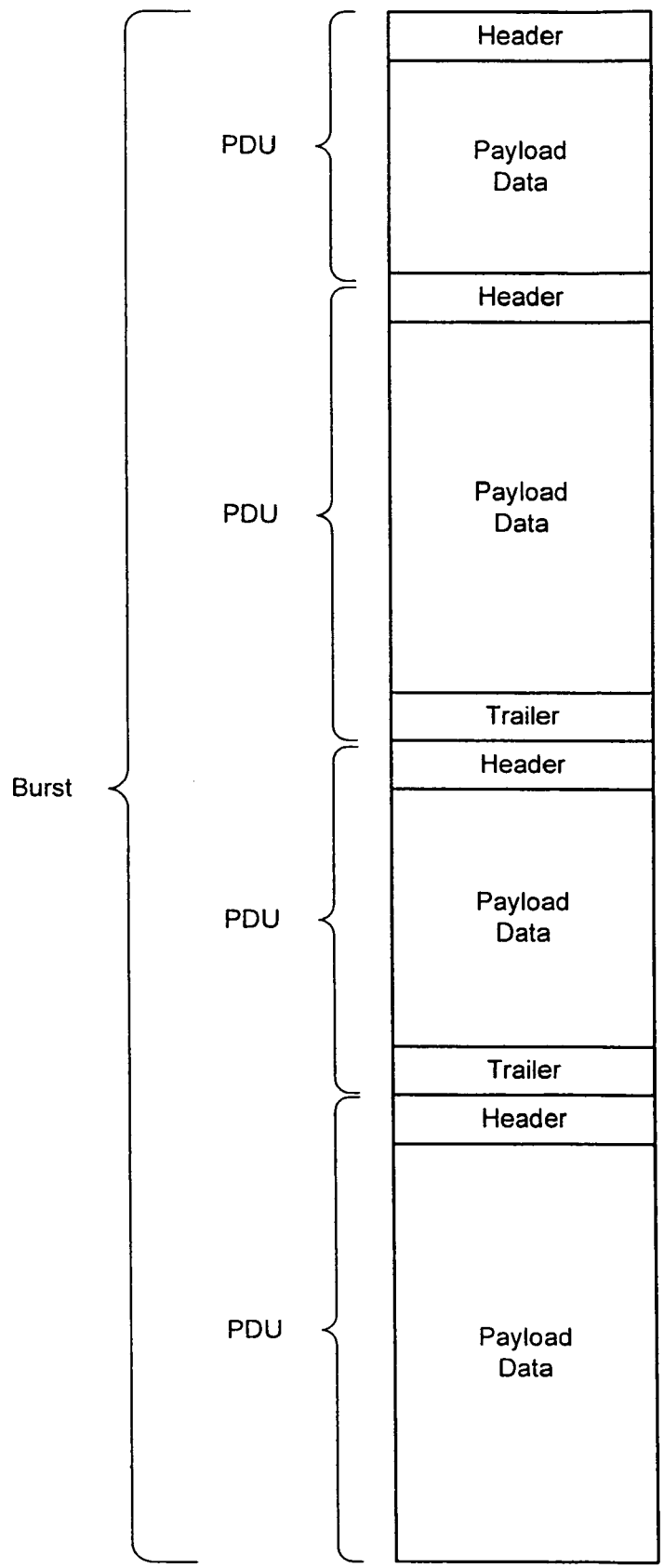
FIG. 5 illustrates a single burst of data containing multiple Protocol Data Units.
Figure 6:
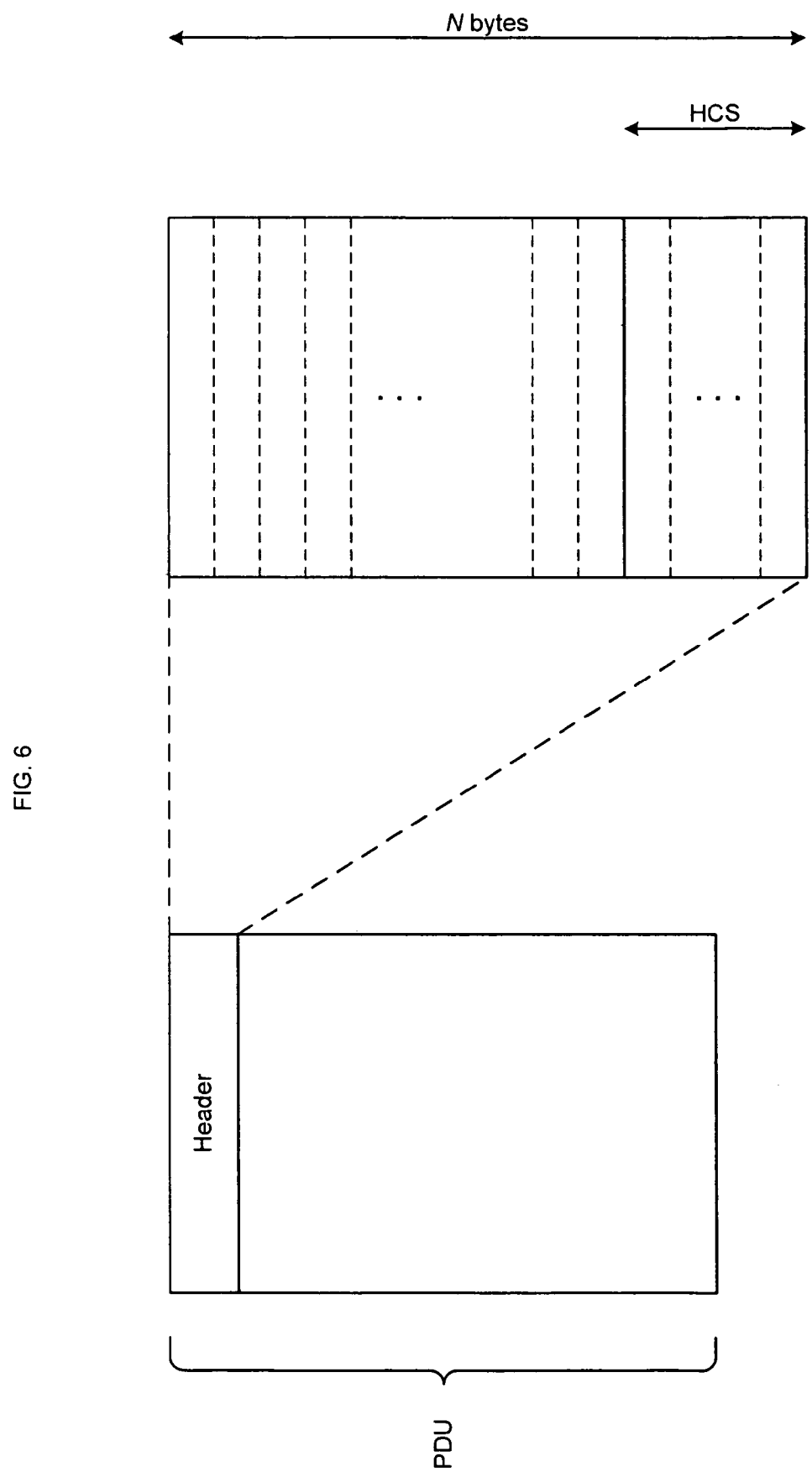
FIG. 6 illustrates a structure of a Protocol Data Unit Header that includes a Header Check Sequence.
Figure 7:
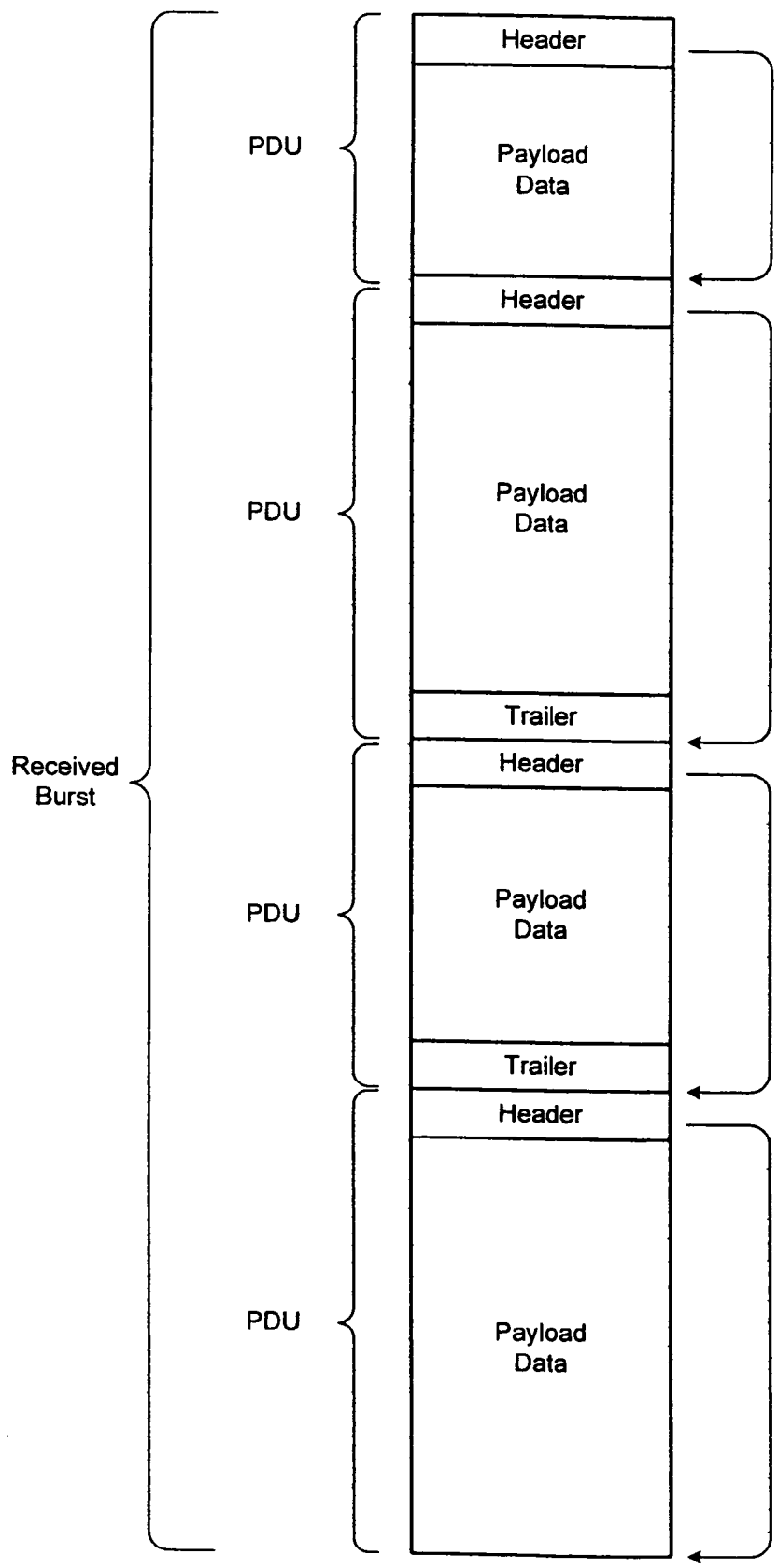
FIG. 7 illustrates a process of unpacking PDUs from a received burst of data.
Figure 8:
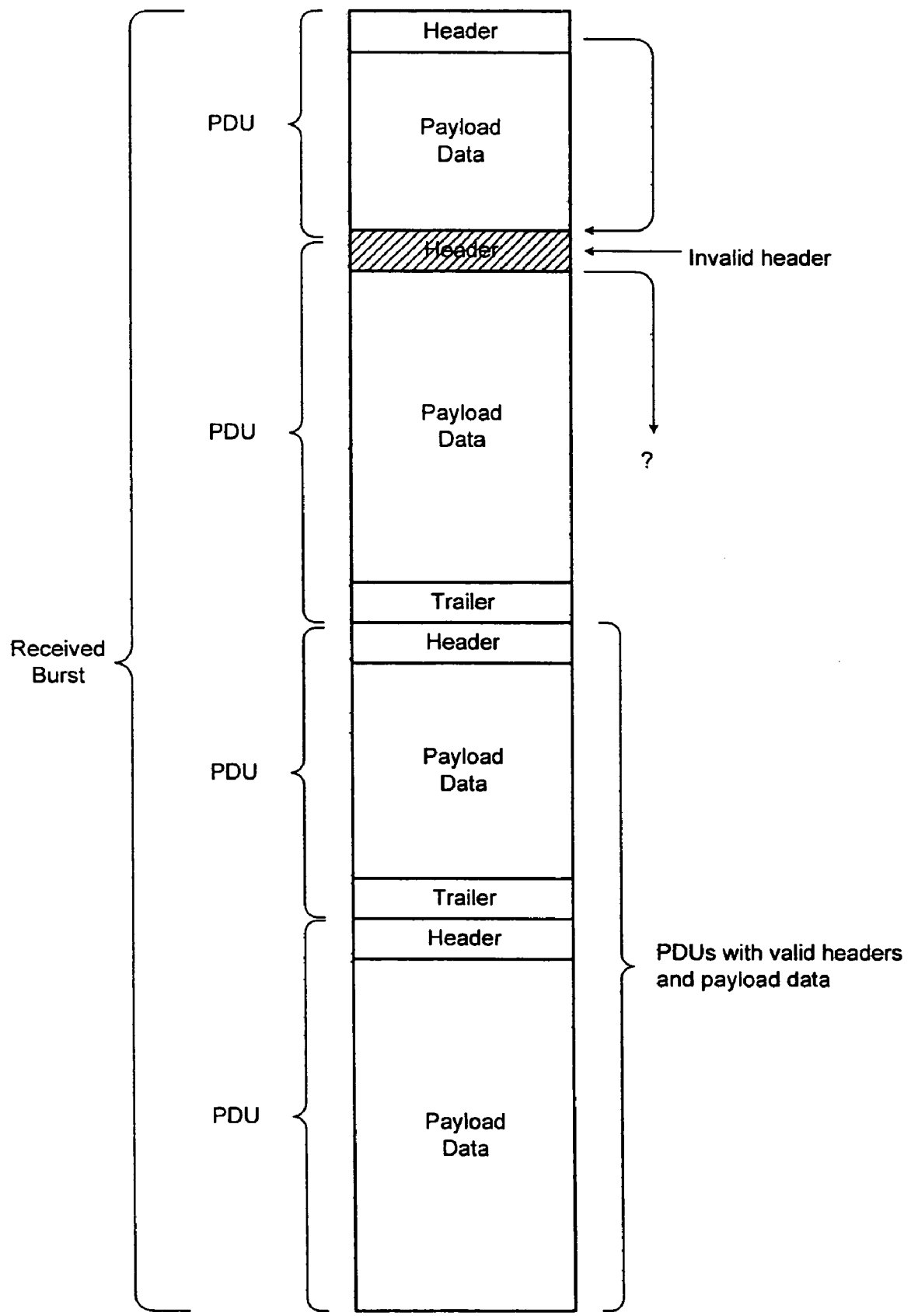
FIG. 8 illustrates a failure condition for the process of unpacking PDUs when an invalid PDU Header in encountered in a received burst of data.

Consider the scenario illustrated in FIG. 5 where multiple PDUs are grouped together and sent as a single burst of data by a transmitter. In accordance with an aspect of the present invention, the receiver (e.g., a wired or wireless receiver) starts processing the received burst of data by checking the validity of the Header of the first PDU. If the PDU Header is valid, the receiver may use the length field in the Header of the first PDU to determine the end of the first PDU and the beginning of the second PDU. The receiver may then check the validity of the Header of the second PDU and if it is valid, it can determine the end of the second PDU and the beginning of the third PDU and so on until all PDUs in the received burst of data are unpacked.

When the receiver encounters an invalid PDU Header while unpacking the PDUs from the received burst of data, it may operate as described herein to determine the next valid PDU Header in the received burst of data. One aspect of the invention described herein takes advantage of the fact that the length of the PDU Header is known a priori. Let N denote the length of the PDU Header in units of bytes. When the receiver detects a PDU with an invalid Header, it preferably starts checking for a valid PDU Header over a window of N bytes at a time in the current received burst of data starting after the end of the current invalid Header.

Figure 9:
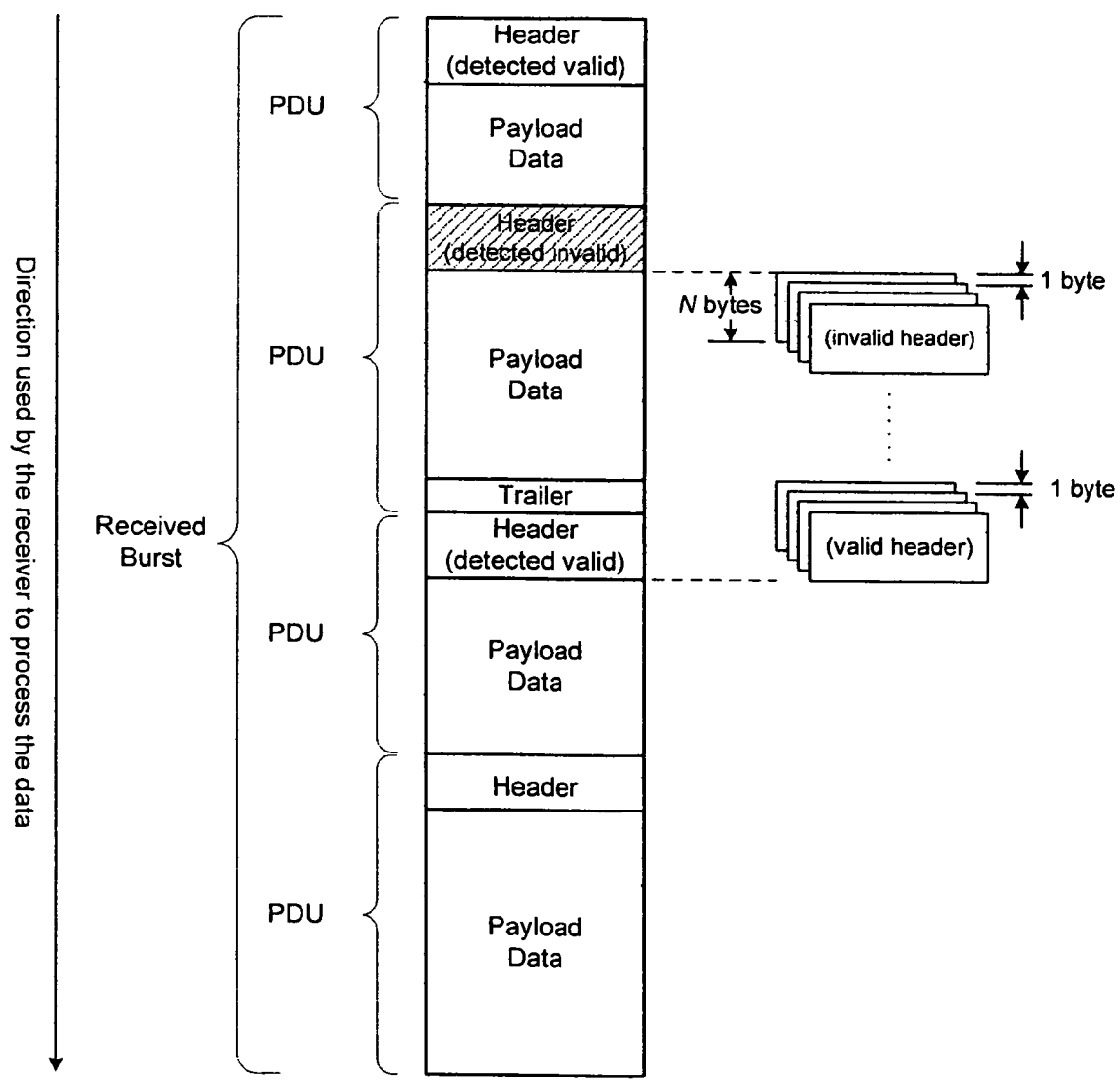
FIG. 9 illustrates a method according to an aspect of the invention described herein for unpacking PDUs when an invalid PDU Header is encountered in a received burst of data.

The receiver may then advance the N-byte window by one byte at a time and check for the presence of a valid PDU Header. The receiver may continue this process in the received burst of the data until a valid PDU Header is detected or the end of the received burst of data is reached. An example of this process is illustrated in FIG. 9. The PDU Header validity check may continue to fail until the receiver advances to the next PDU with a valid Header in the received burst of data. When a valid PDU Header is detected, it may indicate the beginning of a new PDU. The receiver can then resume normal processing of the PDUs in the received burst of data. Whenever the receiver detects a PDU with invalid Header again as it unpacks the remaining received burst of data, the receiver may start checking for a next valid PDU Header again using the method described herein.

Figure 10:
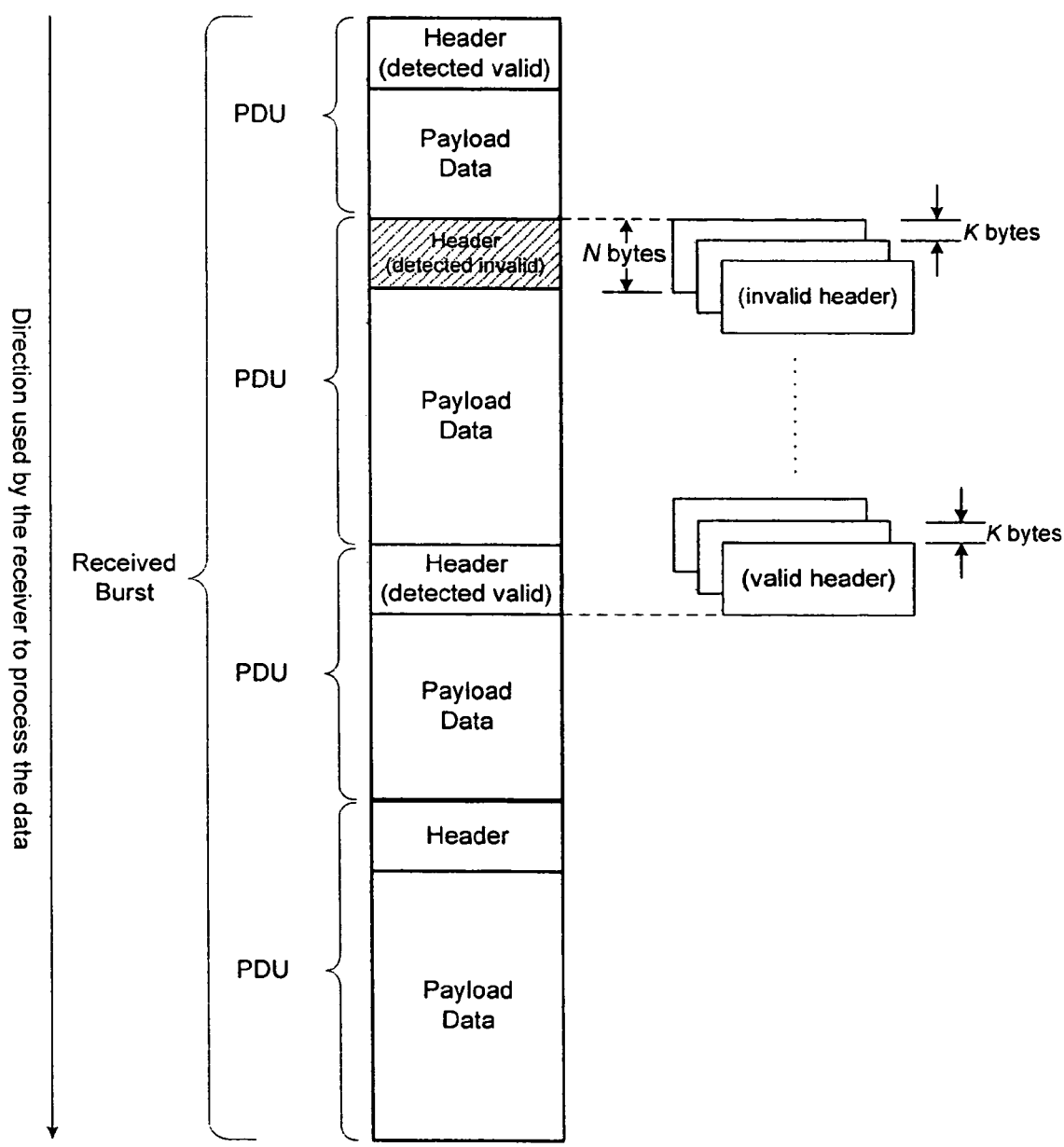
FIG. 10 illustrates a method according to another aspect of the invention described herein for unpacking PDUs when an invalid PDU Header is encountered in a received burst of data and the PDU length is known to be integral multiple of K bytes.

In many communication systems, the PDU length L may be an integral multiple of K bytes such that L=A×K, where A is an integer. According to another aspect of the invention, if such a pattern exists for the length of the PDU, the PDU Header validity check can be performed on an N-byte window and advance it by K bytes at a time sequentially as shown in FIG. 10. Since a new PDU may only start every K bytes, there is no need to check for valid PDU Header at every byte offset. This enables faster PDU boundary detection and reduced processing. In the case where the HCS is not valid for a PDU, the parallel sliding window first may be advanced by a number of bytes equal to the first integral multiple of K that is equal to or greater than N. Subsequently, the parallel sliding window may be advanced by K bytes at a time.

Figure 11:
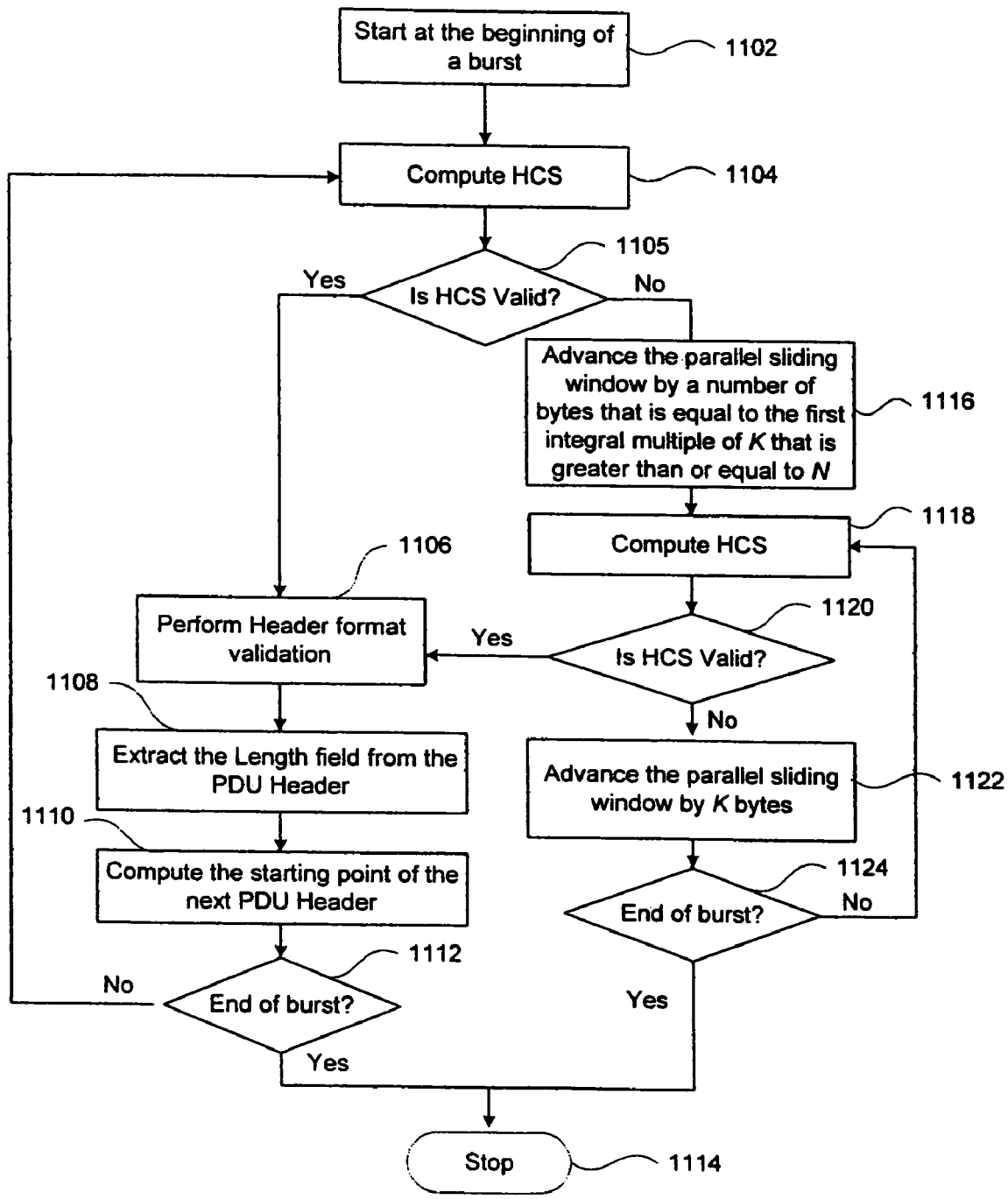
FIG. 11 is a flow diagram illustrating an error resilient PDU boundary detection method in accordance with aspects of the present invention.

In accordance with an embodiment of the present invention, an error resilient PDU boundary detection process 1100 is illustrated in FIG. 11. The process 1100 may initiate at the beginning of a burst as shown in block 1102. As indicated by block 1104, an HCS is then computed. A determination is made at block 1105 as to whether the HCS is valid. If the HCS is valid, then the process proceeds to block 1106, where header format validation is performed.

As indicated in block 1108, a length field is extracted from the PDU header, and as indicated in block 1110, the starting point of the next PDU header is computed. At this point, a determination is made at block 1112 as to whether the end of a burst has been reached. If not, the process may return to block 1104. If the end of a burst has been reached, the process may stop per block 1114.

In the case where the HCS is not valid, the process proceeds to block 1116, where the parallel sliding window may be advanced by a number of bytes that is equal to the first integral multiple of K that is equal to or greater than N (where N may be any whole number). Then the HCS may be computed again as indicated in block 1118. At block 1120, a determination is made as to whether the HCS computed in block 1118 is valid. If so, the process may proceed to block 1106. If not, the process may proceed to block 1122, where the parallel sliding window is advanced by K bytes. Then, at block 1124, a determination is made as to whether the end of a burst has been reached. If not, then the process preferably returns to block 1118. If so, then the process preferably terminates at block 1114.

According to another aspect of the invention, for a PDU that has a separate CRC included for the payload data, it may be possible to use the payload data of that PDU even if its Header is detected to be invalid. For example, consider the case of a PDU with an invalid Header followed immediately by a PDU with a valid Header as shown in FIG. 9. In this case, by performing processes in accordance with the invention described herein it may be possible to detect the beginning of the next valid PDU Header after a PDU with an invalid Header as shown in FIG. 9.

Now, since the beginning of the next PDU with a valid Header is known, the length of the PDU with an invalid Header may be determined. If a separate CRC is included for the payload data, the receiver may check for the validity of the payload data by checking its CRC. If the computed CRC of the payload data matches the received CRC for that PDU, the receiver may be able to use the payload data of the PDU with invalid Header. In some cases there may be two or more consecutive PDUs with invalid Headers present in a received burst of data. In such cases even if a separate CRC is included for the payload data of each PDU, the CRC computed by the receiver may be for a different length of data and therefore the CRC may not match with the received CRC and hence the receiver may not be able to use the payload data of these PDUs with invalid Headers.

Figure 12:
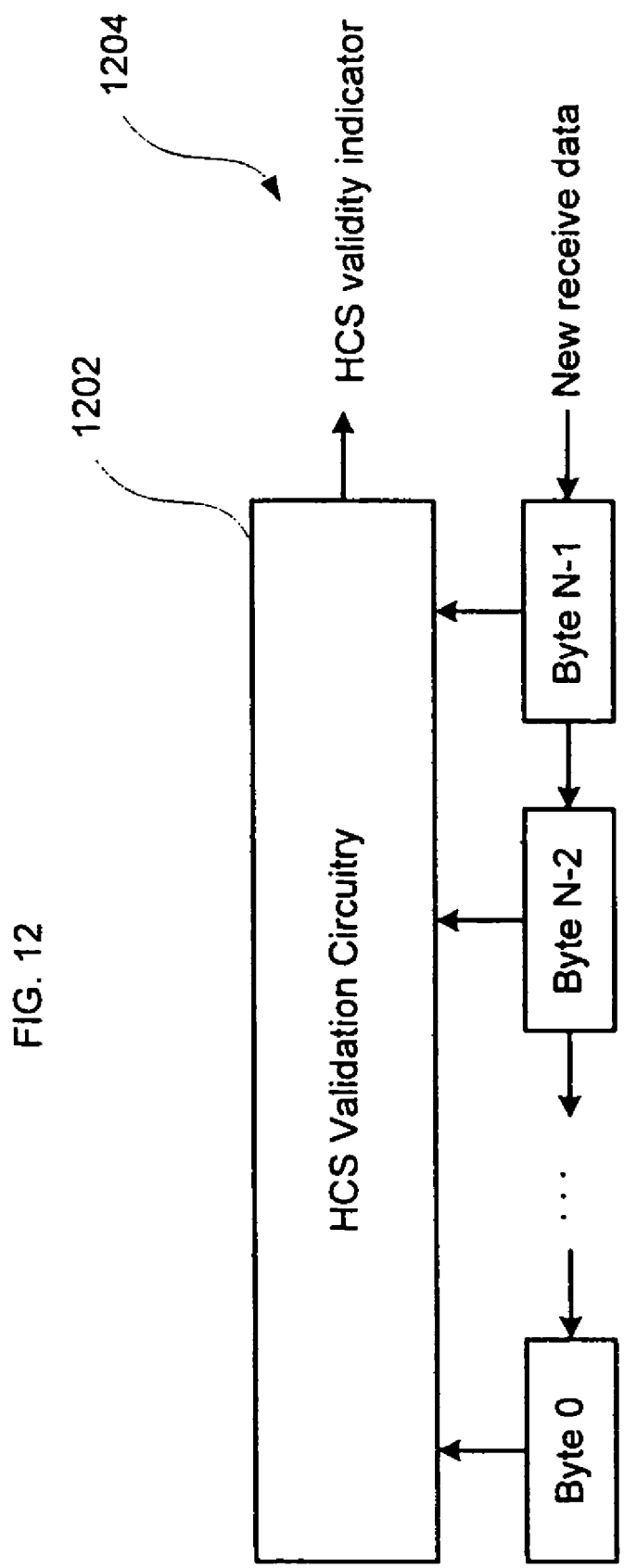
FIG. 12 illustrates a parallel sliding window Header validity check apparatus.

A conventional PDU Header validity check apparatus may require inputting all N bytes of Header before giving an indication of the validity of the PDU Header. According to another aspect of the invention, a parallel sliding window Header validity check apparatus is described. The parallel sliding window apparatus described in the present embodiment may read one new byte at a time from the received burst of data and buffer the previous N−1 bytes in registers as shown in FIG. 12. In this figure, new received data (e.g., bytes 0, . . . , N−2, N−1, etc.) are input into HCS validation circuitry 1202. The registers in the HCS validation circuitry 1202 may be initialized to zero, although this is not required.

The parallel sliding window Header validity check apparatus, HCS validation circuitry 1202, may be able to check for a valid PDU Header over the current set of N bytes in the input buffer. Before the next byte is loaded into the apparatus, the previously stored bytes are shifted by one location to the right to create room for the new byte. The parallel sliding window Header validity check apparatus may indicate the PDU Header validity after inputting the newest byte into the apparatus by issuance of an HCS validity indicator 1204. Compared to a traditional Header validity check apparatus, the parallel apparatus described herein may provide a faster validity indication. Because PDU Header size N is typically small, the processing complexity of the parallel sliding window Header validity check detection is relatively small.

Figure 13A:
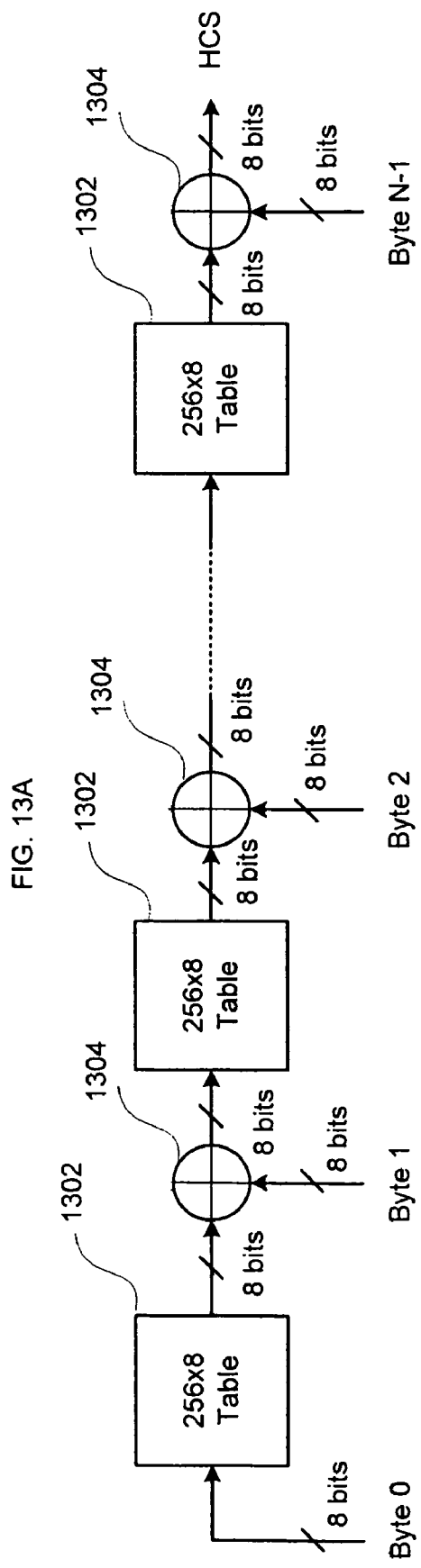
FIG. 13A illustrates an HCS validation circuit in accordance with aspects of the present invention.

FIGS. 12 and 13A illustrate an example of a protocol entity such as a parallel sliding window HCS validation circuitry for an N-byte Header which uses a 1-byte HCS. As shown in FIG. 13A, a number of tables 1302 may be provided for processing each received byte. For example, multiple instances of a table may be created or a single instance of a table may be shared. The content of each table 1302 depends on the generator polynomial used for HCS. An example of a generator polynomial which may be used for the HCS in FIG. 13A is $g(x)=x^8+x^2+x+1$.

Figure 13B:
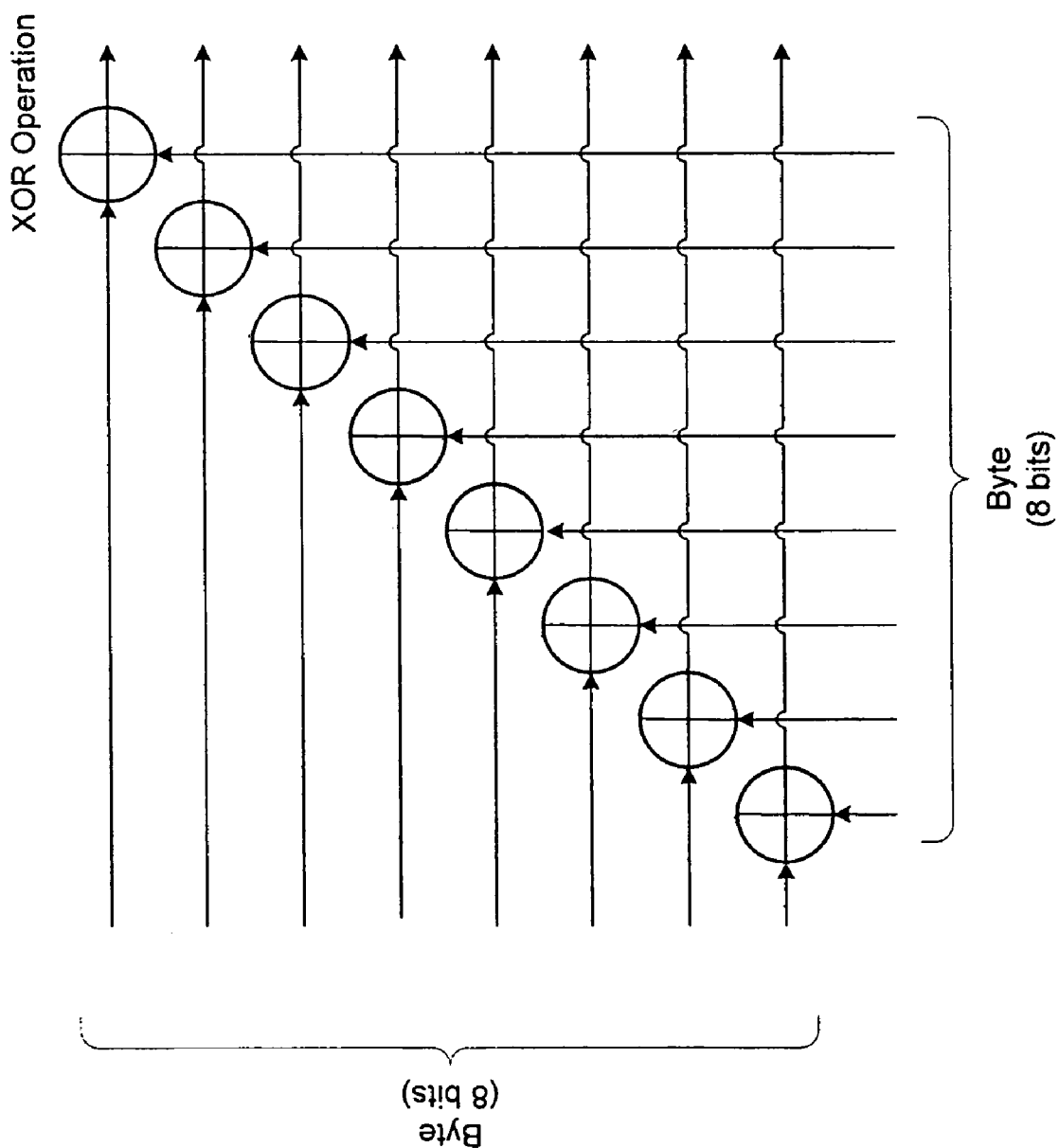
FIG. 13B illustrates an aspect of the HCS validation circuit of FIG. 13A.

FIG. 13A also illustrates a number of exclusive or ("XOR") operators 1304 functionally implemented between tables 1302. As shown, a given byte which is processed in conjunction with a respective table 1302 is XORed with a next byte, and so on. For instance, Byte 0 is processed in conjunction with the leftmost table 1302, and the results are XORed with Byte 1. The output of the leftmost XOR 1304 is processed in conjunction with the second table 1302 from the left, and those results are XORed with Byte 2. The process continues until Byte N−1 is XORed with the output of the rightmost table 1302, and a resultant HCS issues therefrom. The XOR process is logically depicted in FIG. 13B. As indicated in FIGS. 13A and 13B, the input bytes are not directly applied to a table 1302 except for Byte 0. Initially, the value of HCS is zero. Therefore, there is no XOR processing required for Byte 0. Thus, as shown in the figures, Byte 0 is applied directly to a generator polynomial table 1302.

FIG. 14 illustrates a generator polynomial table which may be used in the tables 1302. This exemplary table corresponds to the generator polynomial $g(x)=x^8+x^2+x+1$. There are 256 entries in the table, which corresponds to processing one byte (i.e., 8 bits may have $2^8=256$ combinations). The bit width of the content may be a function of the order of the generator polynomial. For the current example, the order is 8 and therefore the bit width of the content is 8 bits.

When the PDU boundary is known, only the data corresponding to the PDU Header may be input to the parallel sliding window Header validity check apparatus 1202 described herein to check the validity of the PDU Header. In a case where the PDU Header is valid, the data corresponding to the next PDU Header may be input to the apparatus described herein and this process continues. In a case where the PDU Header is detected as being invalid, the data immediately following the current PDU Header may be sequentially input one byte at a time to HCS validation circuitry 1202. After each byte input, the validity of the PDU Header may be checked. This process continues until a valid PDU Header is detected or the end of a received burst of data is reached.

If the PDU length L is an integral multiple of K bytes, then the parallel apparatus described herein may read K bytes at a time and buffer the previous N−K bytes. The HCS validation circuitry 1202 would then check for a valid PDU Header over the current set of N bytes in the input buffer. After checking for PDU Header validity, the oldest K bytes are shifted out and the newest K bytes are shifted into the parallel apparatus for the next PDU Header validity check.

According to another aspect of the invention, the parallel sliding window Header validity check apparatus described herein may have a configurable number of bytes for buffering, inputting, and shifting. This may allow the apparatus to be used in different scenarios where the length of the PDU Header may be known but it may vary. The configurability may require additional processing resources. Therefore, one may tailor a given configuration based on factors such as flexibility and/or resource requirements.

The HCS validity check circuitry depends on the generator polynomial used by the communication system. The generator polynomial may be specified for a given wireless communication standard. By way of example, the generator polynomial used in the table of FIG. 14 is specified in the current version of the IEEE 802.16e standard. If a standard supports multiple HCS and/or if a client terminal supports multiple standards, the client terminal may need to store all necessary generator polynomials in the memory (internal or external) of the baseband subsystem.

The generator polynomial can be selected based on the required HCS by the standard being used by the client terminal at a given instant of time. A controller of the baseband subsystem may perform the selection based on different criteria. Such criteria may include user selection for the preferred type of communication network, any available communication network in a given location at a given point in time, etc. The client terminal may store pre-computed tables in memory which correspond to various generator polynomials or, in an alternative, may compute the tables on an as-needed basis.

There may be many different ways to implement the Header validity check using HCS. The present invention is independent of the specific generator polynomial for the HCS.

The error resilient PDU boundary detection method described herein offers multiple advantages. For instance, it improves the throughput for the receiver and for the overall communication network. By way of example, the error resilient PDU boundary detection method described herein reduces some unnecessary retransmissions which may lead to improved throughput and efficient use of the channel bandwidth of the communication system. For real-time applications, the invention described herein may reduce the loss of data which may in turn improve the quality of service.

Figure 15:
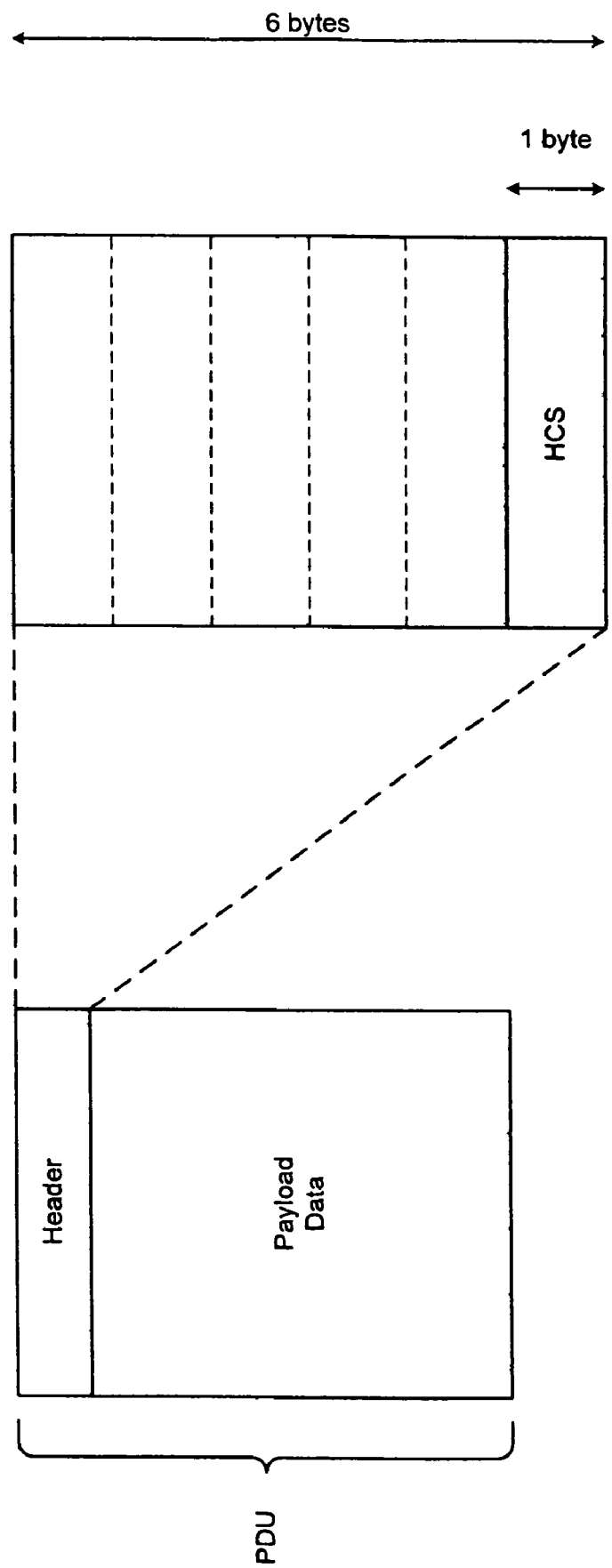
FIG. 15 illustrates an exemplary PDU Header format in an IEEE 802.16 based wireless communication system.

The invention described herein may be applied to a communication system such as an IEEE 802.16 based wireless communication system. In an IEEE 802.16 based wireless communication system, multiple PDUs are grouped together and transmitted as a single burst. In such an IEEE 802.16 wireless communication system, the user payload data and the protocol layer management messages use variable length PDUs with fixed length Generic Medium Access Control ("MAC") Header ("GMH") of six bytes. An example of this is shown in FIG. 15. Here, five bytes of the Header contains various control information fields including the length of the PDU. One byte of HCS is computed over the five byte control information and appended to the control information. For this chosen example, the PDU Header size N=6.

If the PDU Header is invalid for any PDU as the receiver is unpacking the received burst of data, the receiver uses the next six bytes following the invalid PDU Header to check for a valid PDU Header and continues this process by advancing the six byte window corresponding to the PDU Header size by one byte at a time to check for the presence of a valid PDU Header. The receiver continues this process in the received burst of data until a valid PDU Header is detected or the end of the received burst data is reached. The Header validity check may continue to fail until the receiver advances to the next PDU with a valid Header in the received burst of data is reached. When a valid PDU Header is detected, it marks the beginning of a new PDU in the received burst of data. The receiver may then resume normal processing of the remaining PDUs in the received burst of data. Whenever the receiver detects a PDU with invalid Header again as it unpacks the PDUs from the remaining received burst of data, the receiver will start checking for a next valid PDU Header again using the method described herein.

Although it is unlikely, occasionally it may be possible that the PDU Header may be detected as valid but in fact it is invalid. This situation is referred herein as false valid PDU Header detection. In this case, the protocol entity that is processing the received burst of data may further validate the PDU Header content even if it is detected valid. False valid PDU Header detection may happen in many scenarios, including the case when the invention described herein is used. Therefore, the protocol entity that is processing the received burst of data may further validate the PDU Header content even if it is detected valid.

The techniques for further validating the content of the PDU Header depend on the particular format of the PDU Header being used in a given communication system. For example, some of the PDU Header formats may require that content of certain fields within the PDU Header be restricted to only certain values and the receiver may check the content of the received PDU Header for the formats used by the communication system. In case the control information in the PDU Header is detected invalid, the receiver treats the corresponding PDU Header as invalid and the invention described herein may be applied to detect the next valid PDU Header.

Figure 16:
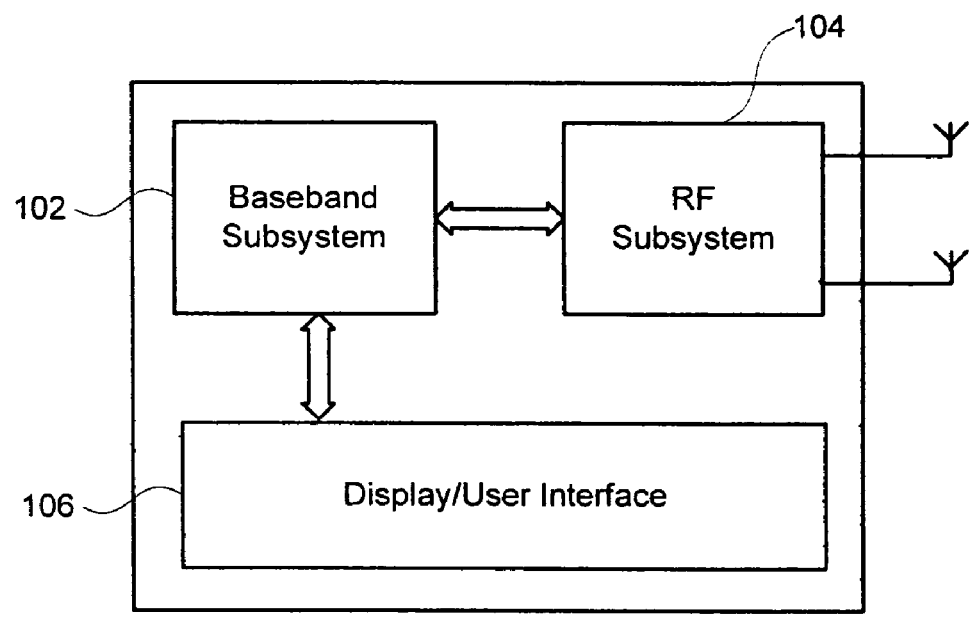
FIG. 16 illustrates an exemplary wireless mobile station for use with aspects of the present invention.

By way of example only, the above-described method may be implemented in a receiver, e.g., a user device such as a wireless mobile station ("MS"). As shown in FIG. 16, MS 100 may include a baseband subsystem 102 and a radio frequency ("RF") subsystem 104 for use with a wireless communication network. A display/user interface 106 provides information to and receives input from the user. By way of example, the user interface may include one or more actuators, a speaker and a microphone.

Figure 17:
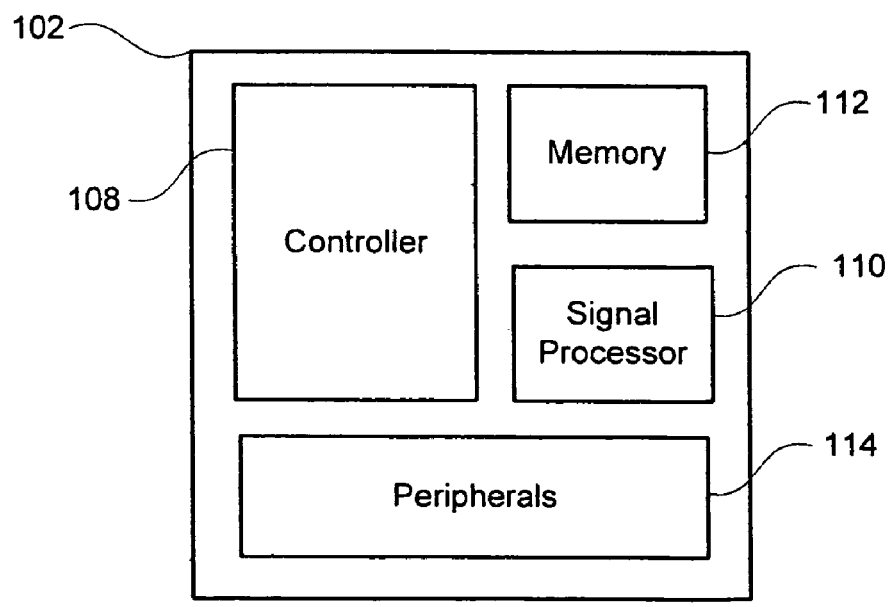
FIG. 17 illustrates an exemplary baseband subsystem for use with aspects of the present invention.

The baseband subsystem 102 as shown in FIG. 17 may include a controller 108 such as a microcontroller or other processor. The controller 108 desirably handles overall operation of the MS 100, including management of the RF subsystem 104. This may be done by software or firmware running on the controller 108. Such software/firmware may embody any methods in accordance with aspects of the present invention.

A signal processor 110 may be used to process samples from the RF subsystem 104 or other information sent or received by the MS 100. The signal processor 110 may be a stand-alone component or may be part of the controller 108. Memory 112 may be shared by or reserved solely for one or both of the controller 108 and the signal processor 110. For instance, signal processing algorithms may be stored in a non-volatile section of memory 112 while coefficients and other data parameters may be stored in RAM. Peripherals 114 such as a full or partial keyboard, video or still image display, audio interface, etc may be employed and managed through the controller 108.

The RF subsystem 104 preferably provides two-way communication operation. It may include one or more receivers/receive chains, a transmitter, a synthesizer, a power amplifier, and one or more antennas operatively coupled together to enable communication. The receive chain(s) is operable to receive signals from one or more channels in a wireless communication network. Aspects of the present invention may be implemented in firmware of the signal processor 110 and/or the controller 108 of the baseband subsystem. In another alternative, aspects of the present invention may also be implemented as a combination of firmware and hardware of the baseband subsystem. For instance, a protocol entity such as the HCS validation circuitry of FIGS. 12 and/or 13A may be implemented in firmware, hardware and/or software. It may be part of the baseband subsystem, the receiver subsystem or be associated with both subsystems. In one example, the controller 108 and/or the signal processor 110 may include or control the HCS validation circuitry. The software may reside in internal or external memory and any data may be stored in such memory. The hardware may be an application specific integrated circuit ("ASIC"), field programmable gate array ("FPGA"), discrete logic components or any combination of such devices. The terms controller and processor are used interchangeably herein.

In another alternative, aspects of the present invention may be implemented in network elements in addition to or distinct from implementation in mobile stations. For instance, one or more base stations of a wireless communication network may employ a baseband subsystem and/or an RF subsystem such as those detailed above. Software and/or firmware embodying any of the methods in accordance with aspects of the present invention may be executed by a controller or signal processor of the baseband subsystem. In another alternative, aspects of the present invention may also be implemented as a combination of firmware and hardware of the baseband subsystem.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of processing received data in a communication system, the method comprising:
   receiving a burst of data with a protocol entity of a receiver, the burst of data including a plurality of protocol data units, each protocol data unit having a header and a payload, the header including a header check sequence therein;
   analyzing the burst of data to determine whether the header check sequence of a given protocol data unit in the burst of data is valid;
   if the header check sequence of the given protocol data unit in the burst of data is valid, then:
      performing header format validation on the given protocol data unit; and
      analyzing the burst of data to determine whether the header check sequence of a next protocol data unit in the burst of data is valid;
   if the header check sequence of the given protocol data unit in the burst of data is invalid, then:
      advancing a parallel sliding window by a number of bytes that is equal to a first integral multiple of K that is equal to or greater than N and computing a subsequent header check sequence, wherein N bytes is the length of the header of the given protocol data unit; and
      if the subsequent header check sequence is valid, then performing the header format validation on the given protocol data unit;
   wherein the payload of a valid protocol data unit is output for subsequent processing by the receiver.

2. The method of claim 1, wherein, upon performing header format validation, the method further comprises:
   extracting a length field from the header of the given protocol data unit;
   computing a starting point of the next protocol data unit header; and
   providing the starting point to the protocol entity for further processing of the received burst of data.

3. The method of claim 2, wherein after the starting point of the next protocol data unit header is computed, determining if the end of the burst has been reached, and if the end of the burst has not been reached, then analyzing the burst of data to determine whether the header check sequence of a next protocol data unit in the burst of data is valid.

4. The method of claim 1, wherein if the subsequent header check sequence is invalid, then the method further comprises advancing the parallel sliding window by K bytes.

5. The method of claim 4, wherein K has a value of 1.

6. The method of claim 5, further comprising issuing a header check sequence validity indicator on a per-byte basis.

7. The method of claim 4, wherein a first input of the parallel sliding window is applied to a generator polynomial table and a second input of the parallel sliding window is exclusive-ORed with an output of the generator polynomial.

8. The method of claim 7, wherein the generator polynomial table is stored in memory of the receiver.

9. The method of claim 7, wherein the generator polynomial table is computed on an as-needed basis.

10. The method of claim 1, wherein when a given protocol data unit boundary is known, only data corresponding to the header of a specific protocol data unit associated with the given boundary is processed by the parallel sliding window.

11. The method of claim 1, wherein if the header check sequence of the given protocol data unit is invalid and if the payload of the given protocol data unit includes an error detection parameter therein, then the method further comprises outputting the payload of the given protocol data unit for subsequent processing by the receiver if a computed error detection parameter matches with the included error detection parameter.

12. A recording medium recorded with a computer program for execution by a processor to process received data in a communication system, the process comprising:
  receiving a burst of data with a protocol entity of a receiver, the burst of data including a plurality of protocol data units, each protocol data unit having a header and a payload, the header including a header check sequence therein;
  analyzing the burst of data to determine whether the header check sequence of a given protocol data unit in the burst of data is valid;
  if the header check sequence of the given protocol data unit in the burst of data is valid, then:
    performing header format validation on the given protocol data unit; and
    analyzing the burst of data to determine whether the header check sequence of a next protocol data unit in the burst of data is valid;
  if the header check sequence of the given protocol data unit in the burst of data is invalid, then:
    advancing a parallel sliding window by a number of bytes that is equal to a first integral multiple of K that is equal to or greater than N and computing a subsequent header check sequence, wherein N bytes is the length of the header of the given protocol data unit; and
    if the subsequent header check sequence is valid, then performing the header format validation on the given protocol data unit;
  wherein the payload of a valid protocol data unit is output for subsequent processing by the receiver.

13. A communication device for use on a communication network, the communication device comprising:
  a baseband subsystem including a processor for managing operations of the communication device; and
  a receiver subsystem operatively connected to the baseband subsystem, the receiver subsystem including a protocol entity operable to receive a burst of data from a transmitter on the communication network, the burst of data including a plurality of protocol data units, each protocol data unit having a header and a payload, the header including a header check sequence therein;
  the processor being operable to manage the protocol entity analyzing the burst of data to determine whether the header check sequence of a given protocol data unit in the burst of data is valid;
  wherein, if the header check sequence of the given protocol data unit in the burst of data is valid, then:
    the protocol entity performs header format validation on the given protocol data unit; and
    analyzes the burst of data to determine whether the header check sequence of a next protocol data unit in the burst of data is valid;
  if the header check sequence of the given protocol data unit in the burst of data is invalid, then:
    the protocol entity advances a parallel sliding window by a number of bytes that is equal to a first integral multiple of K that is equal to or greater than N and computing a subsequent header check sequence, wherein N bytes is the length of the header of the given protocol data unit; and
    if the subsequent header check sequence is valid, then the protocol entity performs the header format validation on the given protocol data unit.

14. The communication device of claim 13, wherein, upon performing header format validation, the protocol entity further:
  extracts a length field from the header of the given protocol data unit; and
  computes a staring point of the next protocol data unit header.

15. The communication device of claim 14, wherein after the starting point of the next protocol data unit header is computed, the protocol entity determines if the end of the burst has been reached, and if the end of the burst has not been reached, then the protocol entity analyzes the burst of data to determine whether the header check sequence of a next protocol data unit in the burst of data is valid.

16. The communication device of claim 13, wherein if the subsequent header check sequence is invalid, then the protocol entity advances the parallel sliding window by K bytes.

17. The communication device of claim 16, wherein a first input of the parallel sliding window is applied to a generator polynomial table and a second input of the parallel sliding window is exclusive-ORed with an output of the generator polynomial.

18. The communication device of claim 17, wherein the generator polynomial table is stored in memory of the communication device.

19. The communication device of claim 17, wherein the generator polynomial table is computed on an as-needed basis by the processor.

20. The communication device of claim 13, wherein the communication network is a wireless communication network, the communication device is a wireless communication device and the receiver subsystem further comprises at least one receive chain operable to receive signals from at least one channel of the wireless communication network.

21. The wireless communication device of claim 20, wherein the communication device is a mobile station.

22. The wireless communication device of claim 20, wherein the device is a base station of the wireless communication network.

* * * * *